(12) United States Patent
Eatough (10) Patent No.: US 8,973,113 B1
(45) Date of Patent: Mar. 3, 2015

(54) SYSTEMS AND METHODS FOR AUTOMATICALLY RESETTING A PASSWORD

(75) Inventor: David A. Eatough, Snoqualmie, WA (US)

(73) Assignee: Crimson Corporation, Dover, DE (US)

( * ) Notice: Subject to any disclaimer, the term of this patent is extended or adjusted under 35 U.S.C. 154(b) by 304 days.

(21) Appl. No.: 12/761,114

(22) Filed: Apr. 15, 2010

(51) Int. Cl.
*G06F 7/04* (2006.01)

(52) U.S. Cl.
USPC .......................................................... 726/6

(58) Field of Classification Search
None
See application file for complete search history.

(56) References Cited

U.S. PATENT DOCUMENTS

| | | | | |
|---|---|---|---|---|
| 5,991,882 | A * | 11/1999 | O'Connell | 726/18 |
| 6,871,286 | B1 * | 3/2005 | Cagle et al. | 726/5 |
| 7,383,575 | B2 * | 6/2008 | Cheston et al. | 726/16 |
| 8,078,881 | B1 * | 12/2011 | Liu | 713/183 |
| 2002/0147914 | A1 * | 10/2002 | Arnold | 713/186 |
| 2003/0114942 | A1 * | 6/2003 | Varone et al. | 700/83 |
| 2005/0138399 | A1 * | 6/2005 | Cheston et al. | 713/189 |
| 2007/0118887 | A1 * | 5/2007 | Roskind | 726/5 |
| 2010/0146602 | A1 * | 6/2010 | Delia et al. | 726/6 |

\* cited by examiner

*Primary Examiner* — Teshome Hailu
(74) *Attorney, Agent, or Firm* — Austin Rapp & Hardman (57) ABSTRACT

A method for automatically resetting a password is described. A failed login attempt in a system is identified. A failed login condition is determined to be satisfied. A user is prompted about resetting a password if the failed login condition is satisfied. A new password is generated based on user input. The new password is sent to the user via voicemail or email.

18 Claims, 9 Drawing Sheets

SYSTEMS AND METHODS FOR AUTOMATICALLY RESETTING A PASSWORD

TECHNICAL FIELD

The present disclosure relates generally to computers and computer-related technology. More specifically, the present disclosure relates to systems and methods for automatically resetting a password.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. These computers are often interconnected to form a computer network. In a computer network, a single server or core server may manage other computers, i.e., nodes.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

As corporate performance and end-user productivity have become increasingly dependent on computers, computer support personnel are continuously under pressure to accomplish more with existing or reduced staff head counts. They are also under pressure to perform tasks as efficiently as possible, which may include minimizing effects to existing computer systems and networks.

Computers on a managed network may implement one or more passwords to control access to computers and networks generally. Sometimes employees and other users may forget passwords. Therefore, there is a need for systems and methods that will automatically reset a password.

DETAILED DESCRIPTION

As computer systems proliferate, there is a corresponding increase in the need for customer support. Often this customer support is provided by an information technology (IT) department within an organization. Although necessary, it may be very expensive for an organization to implement IT services. Therefore, it may be desirable to automate select IT services. One set of concepts and policies for managing IT services is the Information Technology Infrastructure Library (ITIL). ITIL provides a detailed description of a number of important IT practices with comprehensive checklists, tasks, and procedures that can be tailored to any IT organization. In other words, ITIL provides an adaptable methodology for implementing IT services. One aspect of ITIL is the concept of a Service Desk that serves as the central point of contact between IT service providers and end-users who need help. The objectives of a Service Desk, as defined by the ITIL, are to provide a single, informed point of contact for users, and to restore normal operational service to users with minimal business impact on the user. The Service Desk may be implemented using one or more human operators, automated systems, or both.

The concepts behind ITIL, including the Service Desk, are growing in importance to many organization's business strategies. Furthermore, the present systems and methods may provide significant benefits to Service Desk, e.g., reduced workload.

One of the most common IT issues is resetting user passwords. The present systems and methods outline a process where user logins may be monitored and user passwords may be automatically reset without requiring intervention of a Service Desk operation. In addition to reducing the workload of the Service Desk, automatically generated passwords may be more random, thus increasing the security of the organization. For example, if an attacker knew that the Service Desk commonly resets passwords to "Welcome1," an attacker may attack accounts with this password. The automatically generated passwords may vary significantly from standard Service Desk generated passwords such that these attacks may be much less likely to succeed.

Figure 1:
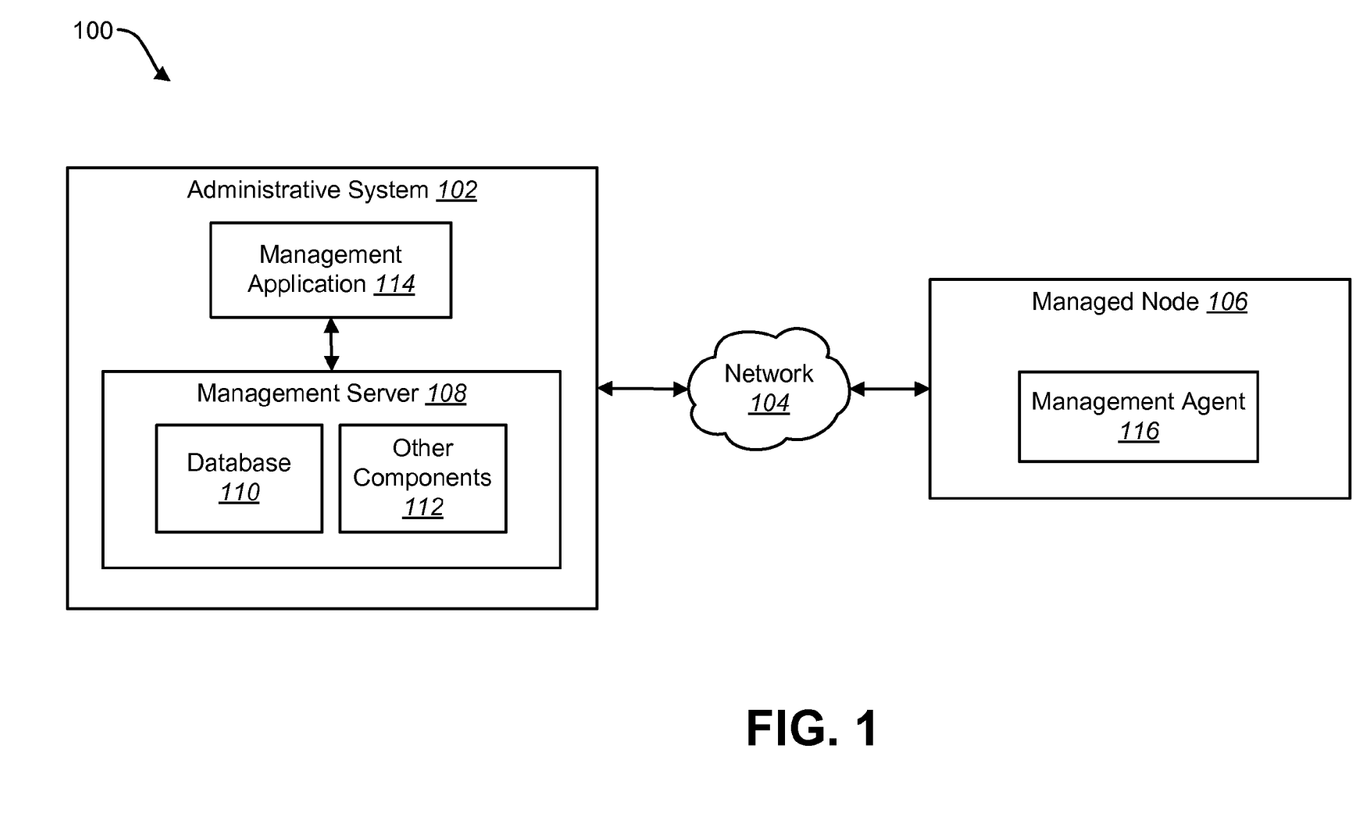
FIG. 1 is a block diagram illustrating a system in which the present systems and methods may be practiced.

FIG. 1 is a block diagram illustrating a system 100 in which the present systems and methods may be practiced. An administrative system 102 may be connected to a computer network 104. The network 104 may represent the Internet, one or more wide area networks (WANs), or one or more local area networks (LANs), etc. The network 104 may be implemented using wired and/or wireless communication technologies and may use any available protocols, such as Hypertext Transfer Protocol (HTTP), to pass data between the administrative system 102 and other computer systems. The administrative system 102 may be used to manage other computer systems that are also connected to the computer network 104. These other computer systems will be referred to herein as "managed nodes" or "nodes." For simplicity, only a single managed node 106 is shown in the system 100. Alternatively, the system 100 may include many additional managed nodes 106.

The administrative system 102 may include a management server 108. The management server 108 may include a database 110 of information. The management server 108 may also include various other components 112 that are configured to perform tasks such as scheduling, handling alerts, and so forth. An example of a management server 108 that may be used with configurations disclosed herein is the core server for the LANDesk® Management Suite.

The administrative system 102 may also include a management application 114. The management application 114 may be used to perform various tasks related to the management of the computer network 104. Examples of tasks that may be performed by the management application 114 include password administration, remote control features, software distribution, software license monitoring, operating system imaging and migration, IT asset management, problem resolution, and acting as a gateway to an external network (not shown) for managed nodes 106. As used herein, an administrative system 102 "manages" a managed node 106 when it performs one or more management tasks with respect to the managed node 106.

As part of performing these tasks, the management application 114 may connect to the management server 108 and query the management server 108 to obtain information. An example of a management application 114 that may be used is the console application for the LANDesk® Management Suite. Although a management server 108 is shown in the configuration illustrated in FIG. 1, not all configurations require a management server 108.

To enable a user of the administrative system 102 to perform management tasks via the management application 114, the managed node 106 may include a management agent 116. The management agent 116 may perform management-related tasks in response to requests from the management application 114. An example of a management agent 116 that may be used is the LANDesk® Management Agent.

The system 100 illustrated in FIG. 1 is merely one possible configuration. While the system 100 shown includes only one managed node 106, other configurations may include many managed nodes 106, networks 104, and subnets (e.g., a portion of an Internet protocol (IP) network defined by a subnet mask).

Figure 2:
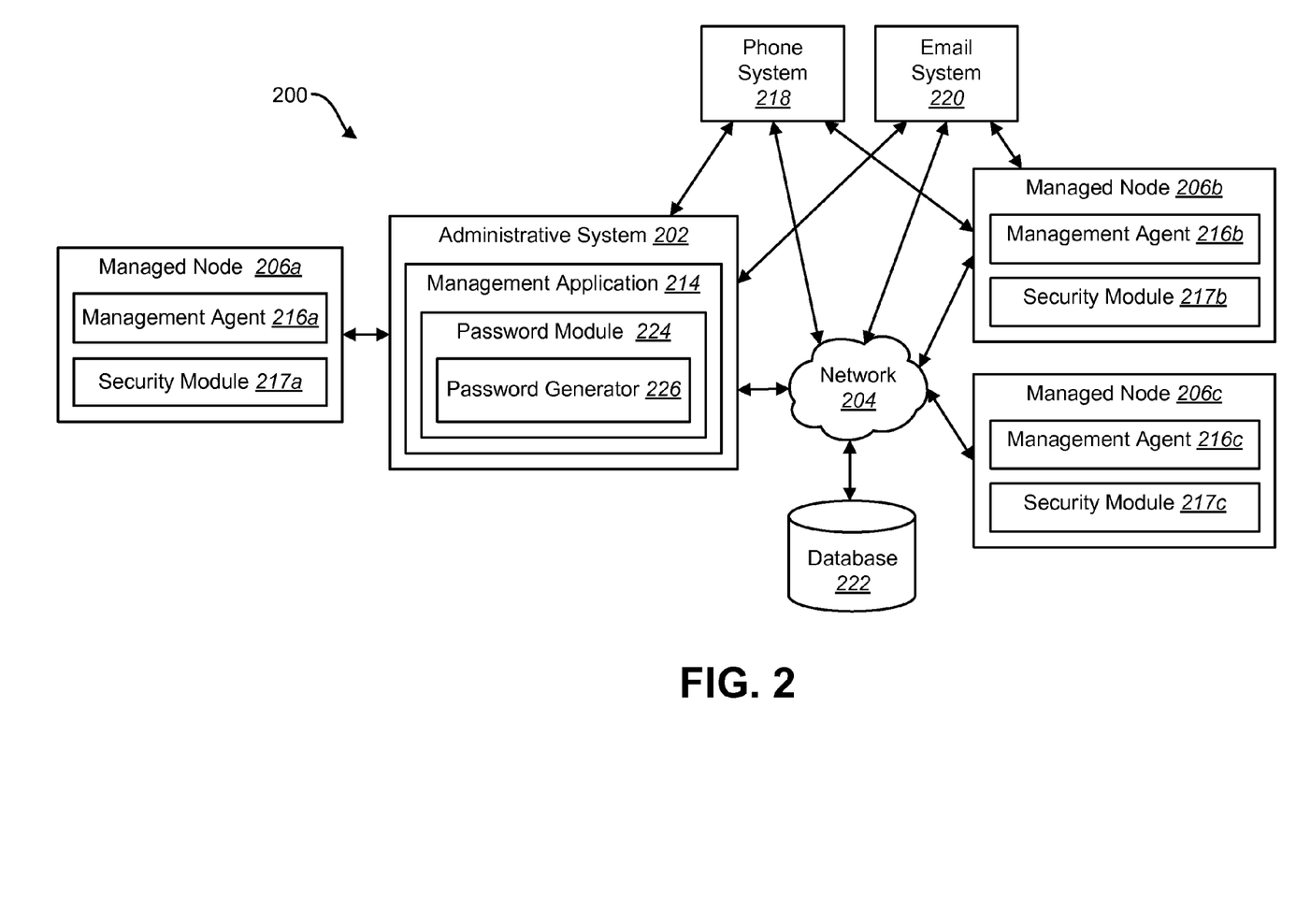
FIG. 2 is a block diagram illustrating a system for automatically resetting a password.

FIG. 2 is a block diagram illustrating a system 200 for automatically resetting a password. The system 200 may include an administrative system 202, a network 204, and one or more managed nodes 206a-c. Additionally, the system 200 may include a phone system 218, an electronic mail (email) system 220, and a database 222. The phone system 218, or the email system 220, or both may be used by the administrative system 202 to send a new password to the managed nodes 206a-c. The administrative system 202 and the managed nodes 206 may connect to the phone system 218 and the email system 220 directly or through a network 204. The database 222 may be accessible to the administrative system 202 and the managed nodes 206a-c and may include, among other data, data necessary for the automatic resetting of passwords.

The administrative system 202 may include a management application 214 that includes a password module 224. The password module 224 may receive requests to reset passwords from the managed nodes 206a-c. In response to these requests, the password module 224 may generate new passwords for the managed nodes 206a-c using a password generator 226, and send the new passwords to the managed nodes 206a-c via the phone system 218 or the email system 220. In the illustrated configuration, the system 200 includes multiple managed nodes 206a-c that are connected to the administrative system 202 either directly or through the network 204. For example, a first managed node 206a may be connected directly, while a second managed node 206b and a third managed node 206c may be connected through the network 204. Additionally, there may be more than one administrative system 202 in the system 200.

The managed nodes 206a-c may each include a management agent 216a-c and a security module 217a-c. The management agents 216a-c may monitor the managed nodes 206a-c for user logins, determine whether one or more failed login conditions have been met, and prompt the user about resetting one or more passwords if the failed login condition(s) have been met. Then, if the user desires to reset the password(s), the management agents 216a-c may generate and send a request to the administrative system 202 to reset the password(s). The security modules 217a-c in the managed nodes 206a-c may be responsible for any security mechanisms involved in communication with the administrative system 202, e.g., authenticating the managed nodes 206a-c with a certificate or domain machine account.

Figure 3:
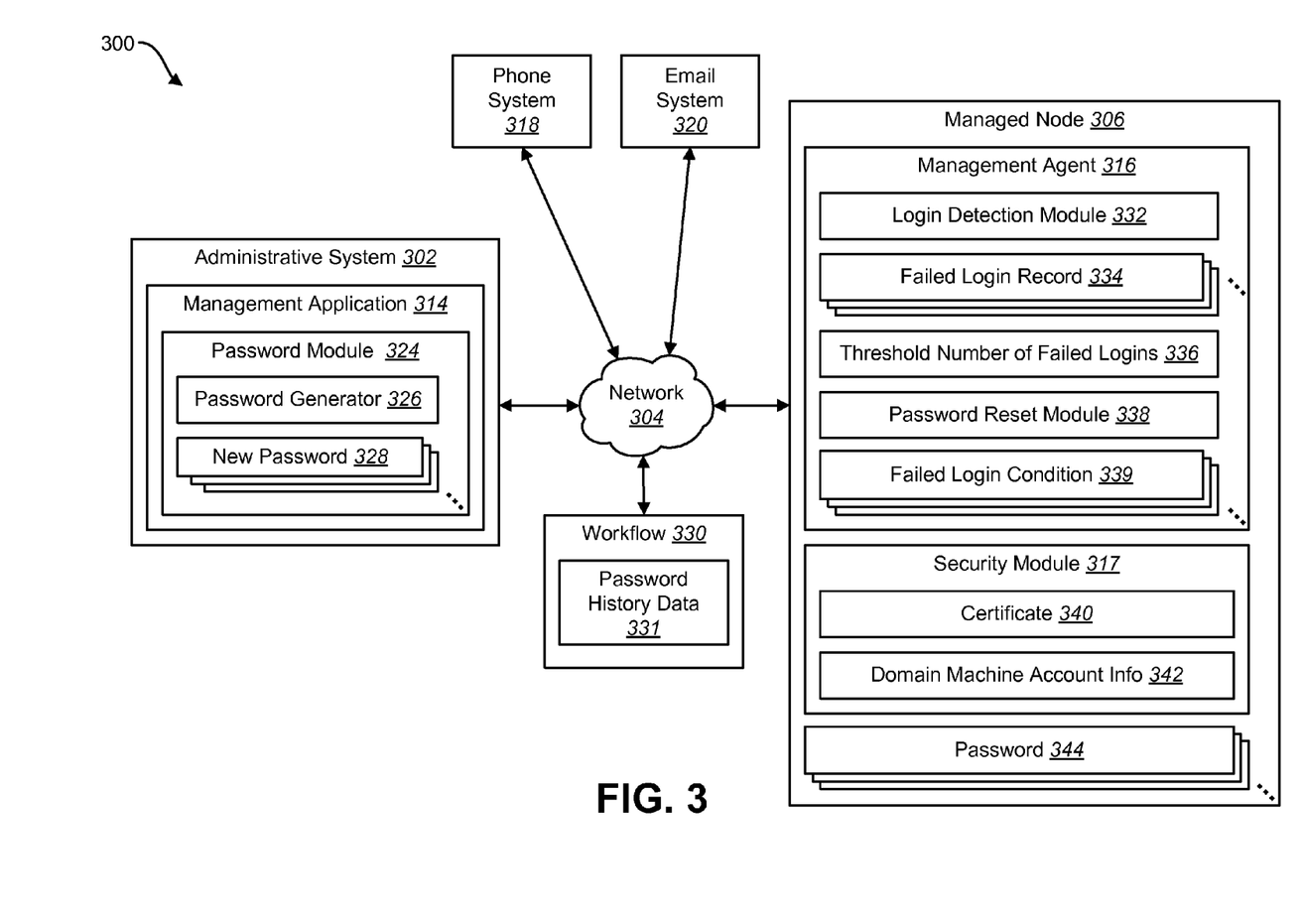
FIG. 3 is a block diagram illustrating another system for automatically resetting a password.

FIG. 3 is a block diagram illustrating another system 300 for automatically resetting a password. As before, a managed node 306 may communicate with an administrative system 302 via a network 304. The system 300 may also include a phone system 318 and an email system 320 that may be used to send a new password 328, generated by the administrative system 302, to the managed node 306. Additionally, while the illustrated configuration describes using the phone system 318 or email system 320 to send the new password 328 to the managed node 306, any organizational trust relationship may be used, e.g., instant messaging, text messaging, etc. Each managed node 306 may include multiple passwords 344 that may be directed to different users. For example, a first password 344 may correspond to a first user while a second password 344 may correspond to a second user.

The managed node 306 may include a management agent 316 that may detect whether the managed node 306 is at a login prompt. This may include a login detection module 332 monitoring the windows currently visible on the desktop of the managed node 306 and determining if they are login windows. Once the managed node 306 determines that a user is at a login prompt, the management agent 316 may look for failed login attempts. A failed login attempt may include the user entering an incorrect password 344 when prompted. Additionally, failed login records 334 may be stored on the management node 306 and may be accessible to management agent 316. The failed login records 334 may be deleted following a successful login attempt or archived in a separate database 222. Identifying failed login attempts may include the login detection module 332 looking for windows that communicate to the user that the last login attempt failed. Once a failed login is identified, the management agent 316 may store the failed login record 334 and determine whether one or more failed login conditions 339 have been met. Each failed login condition 339 may be a relationship involving login data that, when evaluated as true, indicates that a user should be prompted, or asked, about resetting a password 344. One example of a failed login condition 339 may be that the number of failed login attempts since a successful login attempt exceeds a threshold number of failed logins 336. This may include comparing the number of failed login records 334 with the threshold number of failed logins 336. For example, if the there are three or more failed login records 334 since the last successful login attempt, the failed login condition 339 may be met. Alternatively, the threshold number of failed logins 336 may be more or less than three. Then, following any successful login attempt, the login records 334 may be deleted or archived in a separate database 222 so that the number of failed login records 334 is again less than the threshold number of failed logins 336.

If the management agent 316 determines that the failed login condition(s) 339 have been met, the management agent 316 may display a prompt that asks if the user has forgotten their password and if the user would like the password 344 to be reset. This may include the management agent 316 receiving user input in any suitable form, e.g., keyboard, mouse, etc. If the user indicates that they would like a password reset, a password reset module 338 may communicate with the password module 324 on the management application 314 and request that the password 344 be reset.

To communicate with the administrative system 302, the managed node 306 may use one or more security mechanisms in a security module 317 for verifying that the managed node 306 requesting the reset is an authorized computer. Any suitable security mechanism for authenticating an electronic device may be used to authenticate the managed node 306 when requesting a password 344 reset. Examples of possible security mechanisms include having the managed node 306 use a certificate 340 or domain machine account 342 for authentication.

For example, one part of the security mechanism provides a way for the managed node 306 to uniquely identify itself to the administrative system 302. In one configuration, a managed node 306 that uses a certificate for authentication creates a digital signature of the message it is sending. For example, the managed node 306 may generate a one-way hash (e.g. Message-Digest algorithm 5 (MD5), Secure Hash Algorithm 1 (SHA1)) and encrypt the hash with the private key of the managed node 306. The administrative system 302 may then use the public key of the managed node 306 to decrypt the hash and verify that the message came from the managed node 306. Alternatively, the managed node 306 may authenticate the request by connecting to the administrative system 302 using the Secure Socket Layer (SSL) protocol with client-side authentication. These are only examples of how the managed node 306 may identify itself to the administrative system 302. Any network protocol that provides a mechanism for the client to authenticate may be used.

In response to the request from the password reset module 338, a password generator 326 may generate a new password 328 and send it to the user of the managed node 306 via the phone system 318 or the email system 320. Additionally, the administrative system 302 may send the new password 328, unknown to the user, to the managed node 306 where the management agent 316 may then replace the password 344 with the new password 328. The user may then retrieve the new password 328 from the phone system 318 or the email system 320 and login into the managed node 306. Thus, by using this configuration, an end user may handle a task that may otherwise require intervention from a Service Desk operator.

Alternatively, the password 344 may not reside on the managed node 306. Instead, the managed node 306 may simply communicate any password input received from the user to the administrative system 302 or other device on the network 304 that may then determine the accuracy of the password 344. In one configuration, the password 344 resides only on the administrative system 302.

The password 344 entered on the managed node 306 and reset by the present systems and methods may be a system-wide password 344, not only a local password. In other words, the password 344, when correctly entered, may enable the user to access not only the managed node 306 on which it is entered, but also other managed nodes 306 (not shown), the administrative system 302, other devices on the network 304, etc. Additionally, the system 300 may be utilized to reset multiple passwords 344 for a single user or one or more passwords 344 for multiple users.

In one configuration, the system 300 may include a workflow 330 that may include password history data 331. The workflow 330 may initiate the password reset process and may reside on the administrative system 302, the managed node 306, or both. This workflow process 330 may be triggered prior to prompting the user for the password 344. In other words, the workflow 330 may operate in parallel and/or replace some of the aspects described above, e.g., prompting the user for the password 344, password reset module 338. The workflow 330 may itself communicate with the password module 324 in the management application 314 and the phone system 318 or email system 320. Additionally, the workflow 330 may generate any needed alerts and may be customized and/or initiated by the user. For example, the workflow 330 may add checks for how frequently the password has been reset using the password history data 331 and may implement other logic that may detect and report abuses of the system 300.

A workflow system (e.g. Windows Workflow Foundation, other workflow systems, etc.) may be applied to the systems and methods disclosed herein. By integrating a workflow system into the systems and methods disclosed, an administrator may be provided with the ability to customize the password resetting process. This may allow authorized software developers to build organization-specific logic into the password reset process or to perform integration with a proprietary e-mail or phone system. The developed software may then be deployed to the managed nodes 306 in a secure manner (i.e. the system would require an administrative level of authentication in order to allow the workflow to be deployed) and an organization's workflow logic could then be integrated into the password reset mechanism.

The workflow may reside on either the managed node 306 or the administrative system 302. Alternatively, portions of the workflow could be carried out on both systems 306, 302. This may enable integration with proprietary systems, allow an organization to put in place business logic to monitor login attempts and detect potential security issues or allow the organization to define additional business logic that must be performed before resetting the password.

Figure 4:
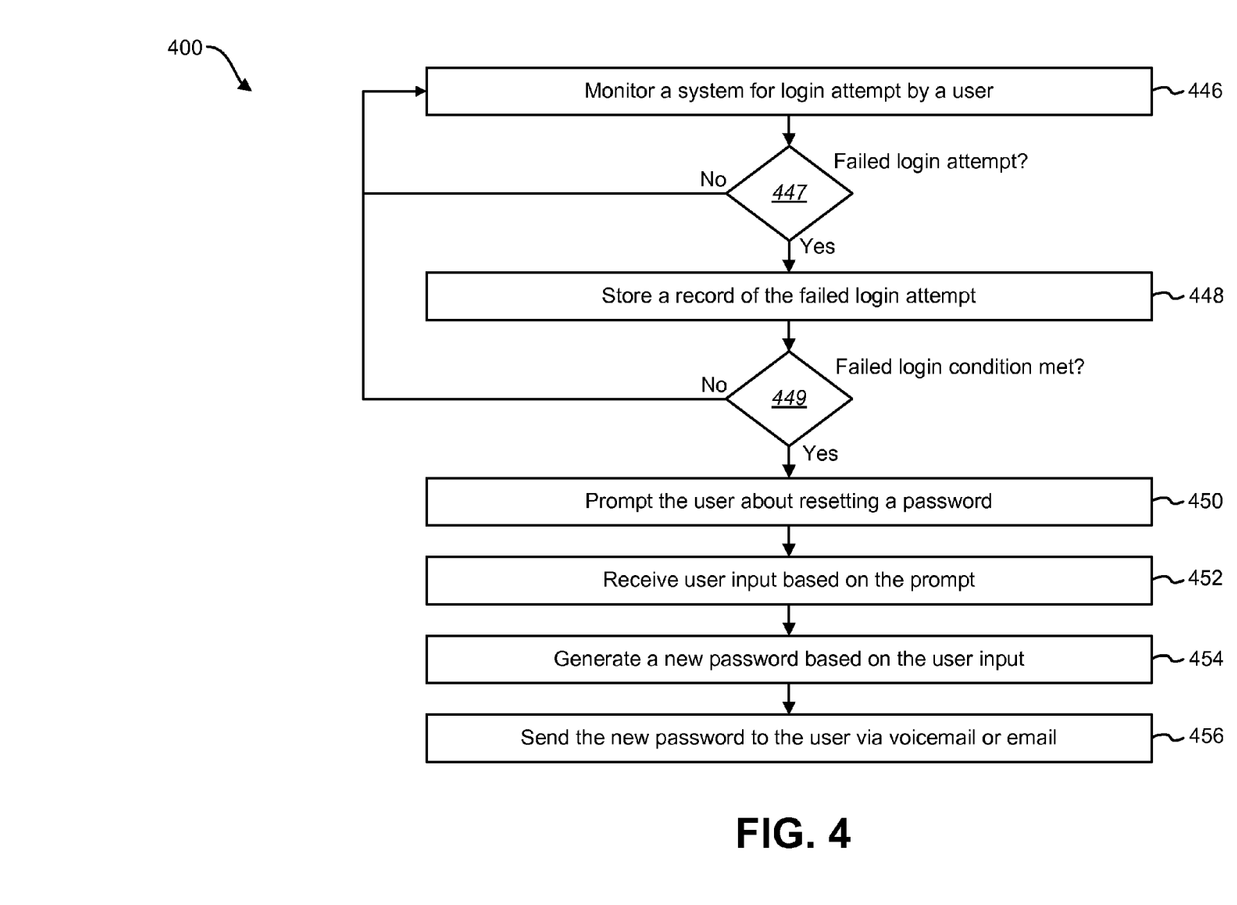
FIG. 4 is a flow diagram illustrating a method for automatically resetting a password.

FIG. 4 is a flow diagram illustrating a method 400 for automatically resetting a password. The method 400 may be performed in a computer system, such as the system 300 illustrated in FIG. 3 that includes a managed node 306 and an administrative system 302. A managed node 306 may be monitored 446 for a login attempt by a user. Once a login attempt is identified, the managed node 306 may determine 447 whether the login attempt is a failed login attempt. This may include looking for windows visible on the desktop of the managed node 306 that communicate to the user that the last login failed. If the login attempt is not a failed login attempt, the managed node 306 may revert to monitoring 446 for login attempts. If, however, the login attempt is a failed login attempt, the managed node 306 may store 448 a record of the failed login attempt 334.

The managed node 306 may also determine 449 if a failed login condition 339 has been met. This may include determining if the number of failed login records 334 exceeds a threshold number of failed logins 336 stored on the managed node 306. For example, if a login detection module 332 detects three or more failed login attempts since the last successful login attempt, the failed login condition 339 may be met. If the failed login condition 339 has not been met, the managed node 306 may revert to monitoring 446 for login attempts. If the failed login condition 339 has occurred, the managed node 306 may prompt 450 the user about resetting the password 344. The prompt may include displaying a window to the user asking them whether they would like the password 344 reset. User input may be received 452 in response to the prompting 450, e.g., the user would or would not like their password 344 reset. A new password 328 may be generated 454 based on the user input. This may include a password generator 326 on the administrative system 302 generating a new password 328. The new password 328 may be sent 456 to the user via a phone system 318, such as leaving a message on the user's voicemail, or an email system 320. Likewise, other systems may be used to transmit the new password 328 to the user, e.g., instant messaging or text messaging.

Figure 5:
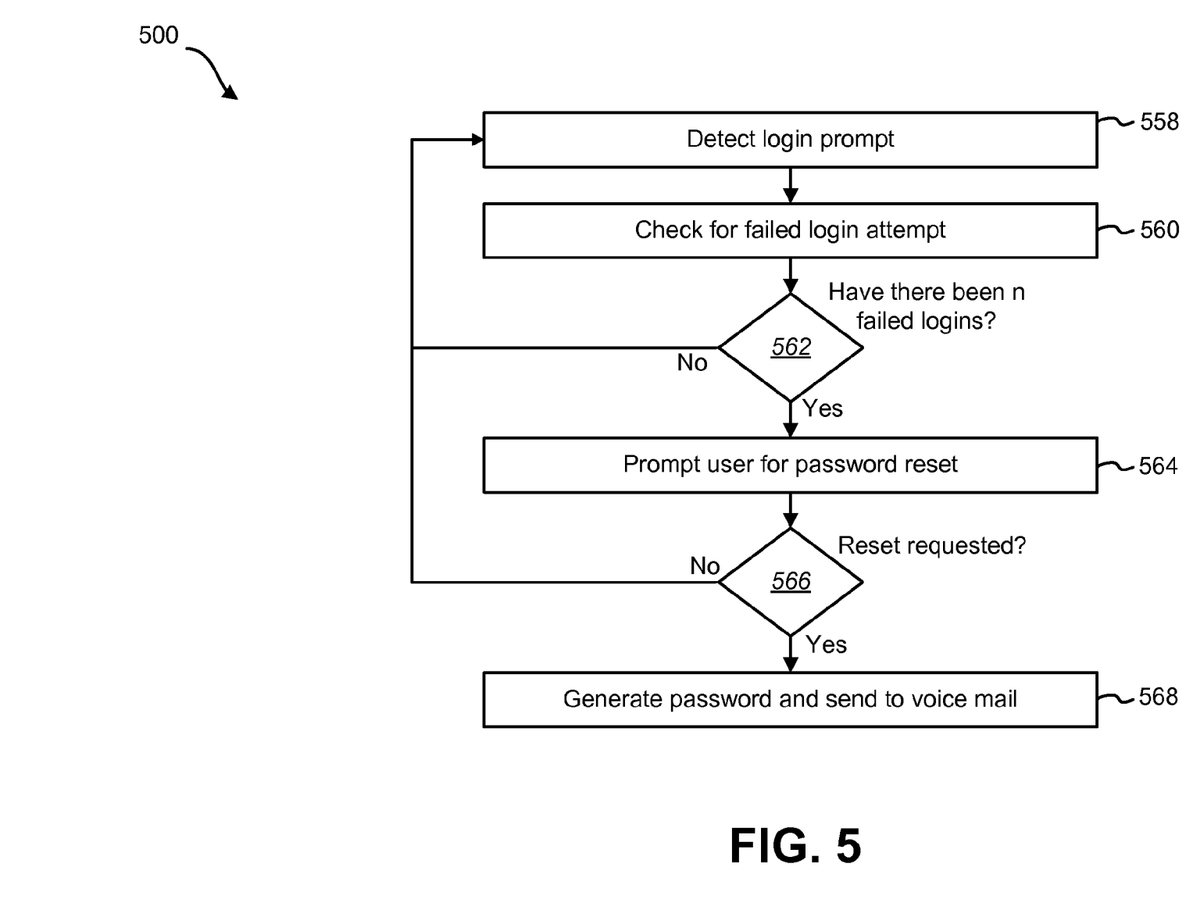
FIG. 5 is flow diagram illustrating another method for automatically resetting a password.

FIG. 5 is flow diagram illustrating another method 500 for automatically resetting a password. The method 500 may be performed in a computer system, such as the system 300 illustrated in FIG. 3 that includes a managed node 306 and an administrative system 302. First, a login prompt may be detected 558. This may include looking at the visible windows on a managed node 306, such as a managed node 306, and determining whether they are login windows. The managed node 306 may also check 560 for a failed login attempt. A failed login attempt may include a user entering an incorrect password 344 when prompted. The managed node 306 may also determine 562 whether there have been n failed login attempts, where n represents a predetermined threshold number of failed logins 336, e.g., three. If there have not been n failed logins, the managed node 306 may again detect 558 for failed logins. If there have been n failed logins, the user may be prompted 564 for a password reset. This may include displaying a window on the managed node 306 that asks whether the user would like to reset their password 344. The managed node 306 may also determine 566 the response to the prompt. If the user does not want to reset their password, the managed node 306 may again detect 558 failed logins. If, however, the user wants to reset their password, a new password 328 may be generated 568 and sent to the voicemail of the user. This generating 568 may include a password generator 326 on the administrative system 302 generating a new password 328 in response to a request sent from a password reset module 338 on the managed node 306.

Figure 6:
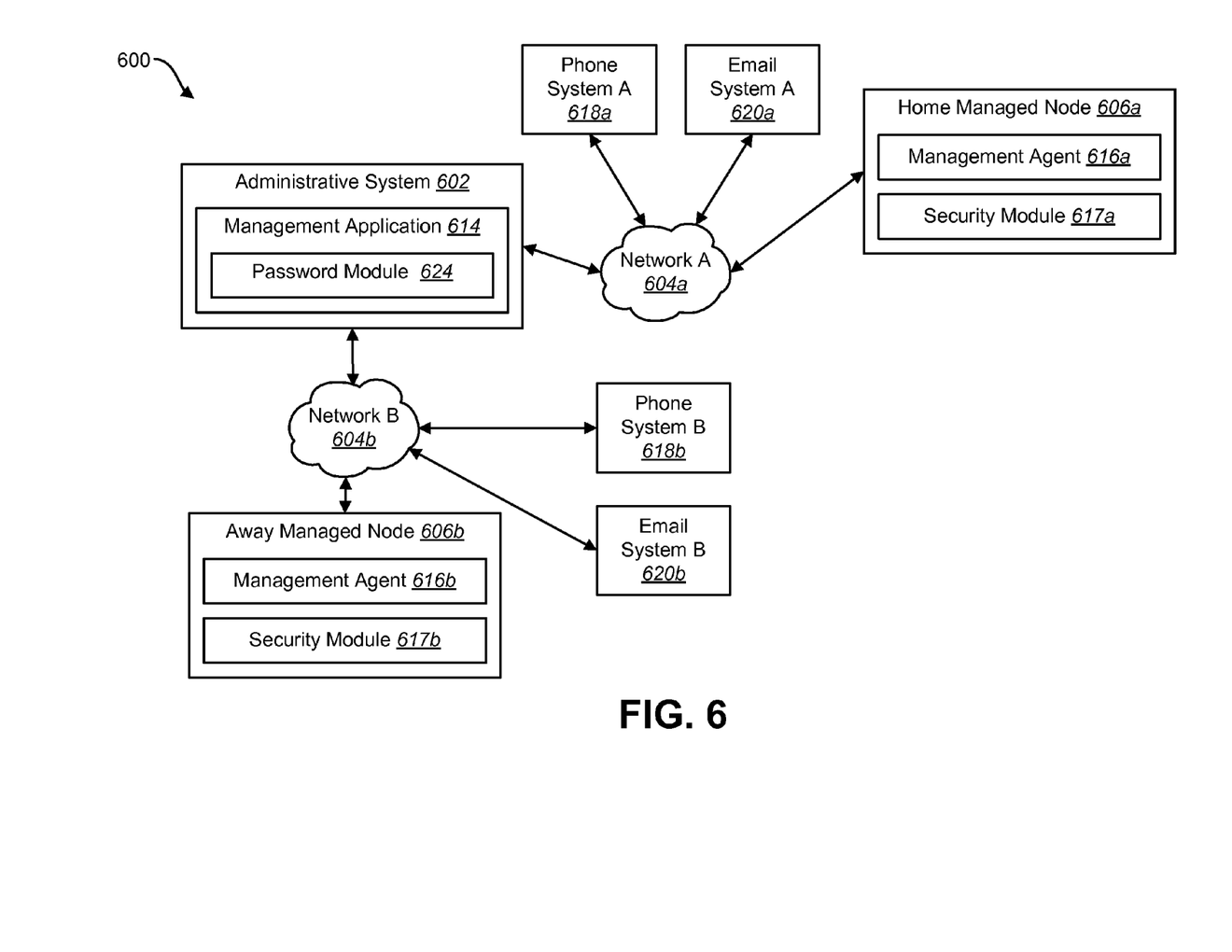
FIG. 6 is a block diagram illustrating another system for automatically resetting a password.

FIG. 6 is a block diagram illustrating another system 600 for automatically resetting a password. The system 600 may include an administrative system 602 that communicates with one or more managed nodes 606*a-b*, phone systems 618*a-b*, and email systems 620*a-b* through one or more networks 604*a-b*. As before, the administrative system 602 may include a management application 614 with a password module 624.

In one configuration, the system 600 may have more than one managed node 606. One of the nodes may be designated as the home managed node 606*a* and the rest of the nodes may be designated as away nodes 606*b*. The home managed node 606*a* may be the managed node 606 where the user commonly logs on, e.g., the managed node 606 on which a particular user logs into more than any other node 606. A particular managed node 606 may be the home managed node 606*a* for one user but not another user. The away managed nodes 606*b* may be any managed nodes 606 where a particular user does not commonly log on.

As before, each managed node 606 may include a management agent 616*a-b* that monitors for failed login attempts and requests that a password 344 be reset based on user input and a failed login condition 339. In one configuration, however, the resetting of passwords 344 may be limited to home managed nodes 606*a*. In other words, the managed nodes 606 may only perform the methods described herein if the managed node 606 is the home managed node 606*a* for the user attempting to login. For example, if a user forgets their password 344 at the home managed node 606*a*, such as a desktop PC they use every day, the managed node 606 may prompt her for an automatic password reset. If, however, the user forgets her password 344 while using an away managed node 606*b*, such as a traveling workstation (a general use terminal for people traveling to other locations within an organization), the managed node 606 may not prompt her for an automatic password reset. Each managed node 606 may also include a security module 617*a-b* that is responsible for any security mechanisms involved in communication with the administrative system 602, e.g., authenticating the managed nodes 606 with a certificate or domain machine account.

Furthermore, additional security precautions may be implemented. In one configuration, if the user enters an incorrect password 344, the managed node 606 may verify secondary identification indicators before requesting a password 344 reset from the administrative system 602. For example, this may include verifying a user's fingerprint with a fingerprint scanner, verifying a nearby radio frequency identification (RFID) signal (from an RFID card on the user), verifying a user's iris or retina pattern with an iris or retina scanner, etc. Additionally, a managed node 606 may require that the user's device (cell phone, PDA, smartphone, etc.) to which the new password 328 is sent be nearby to the managed node 606 before requesting a password 344 reset from the administrative system 602, e.g., proximity verified by Bluetooth, RFID, etc.

Figure 7:
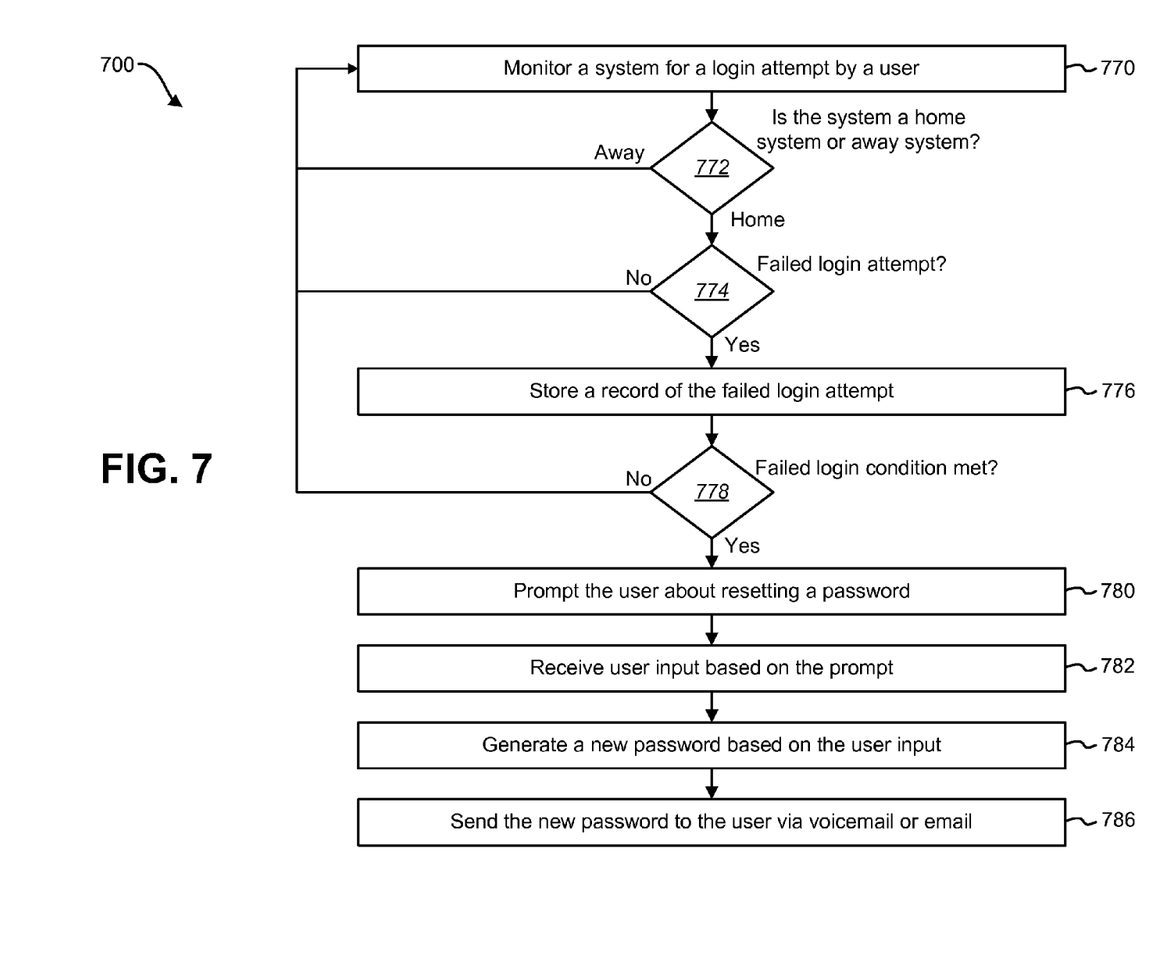
FIG. 7 is a flow diagram illustrating another method for automatically resetting a password.

FIG. 7 is a flow diagram illustrating another method 700 for automatically resetting a password. The method 700 may be performed in a computer system, such as the system 600 illustrated in FIG. 6 that includes a home managed node 606*a*, one or more away managed nodes 606*b*, and an administrative system 602. A managed node 606 may be monitored 770 for a login attempt by a user. Once a login attempt is identified, the managed node 606 may determine 772 whether the managed node 606 is a home managed node 606*a* or an away managed node 606*b*. If the managed node 606 is an away managed node 606*b*, it may resume monitoring 770 for login attempts. If the managed node 606 is a home managed node 606*a*, it may determine 774 whether the login attempt is a failed login attempt. This may include looking for windows visible on the desktop of the computer system that communicate to the user that the last login failed. If the login attempt is not a failed login attempt, the managed node 606 may revert to monitoring 770 for login attempts. If, however, the login attempt is a failed login attempt, the managed node 606 may store 776 a record of the failed login attempt 334.

The managed node 606 may also determine 778 if a failed login condition 339 has been met. The failed login condition 339 may be that the number of failed login records 334 exceeds a threshold number of failed logins 336 stored on the home managed node 606*a*. For example, if the managed node 606 detects three or more failed logins since the last successful login, the failed login condition 339 may be met. If the failed login condition 339 has not been met, the managed node 606 may revert to monitoring 770 for login attempts. If the failed login condition 339 has occurred, the managed node 606 may prompt 780 the user about resetting a password 344. The prompting 780 may include displaying a window to the user asking them whether they would like their password 344 reset. User input may be received 782 based on the prompting 780, e.g., the user would like their password reset. A new password 328 may be generated 784 based on the user input. This may include a password generator 326 on the administrative system 602 generating a new password 328.

Lastly, the new password 328 may be sent 786 to the user via a phone system 618, such as leaving a message on the user's voicemail, or an email system 620. Likewise, other systems may be used to transmit the new password 328 to the user, e.g., instant messaging or text messaging.

Figure 8:
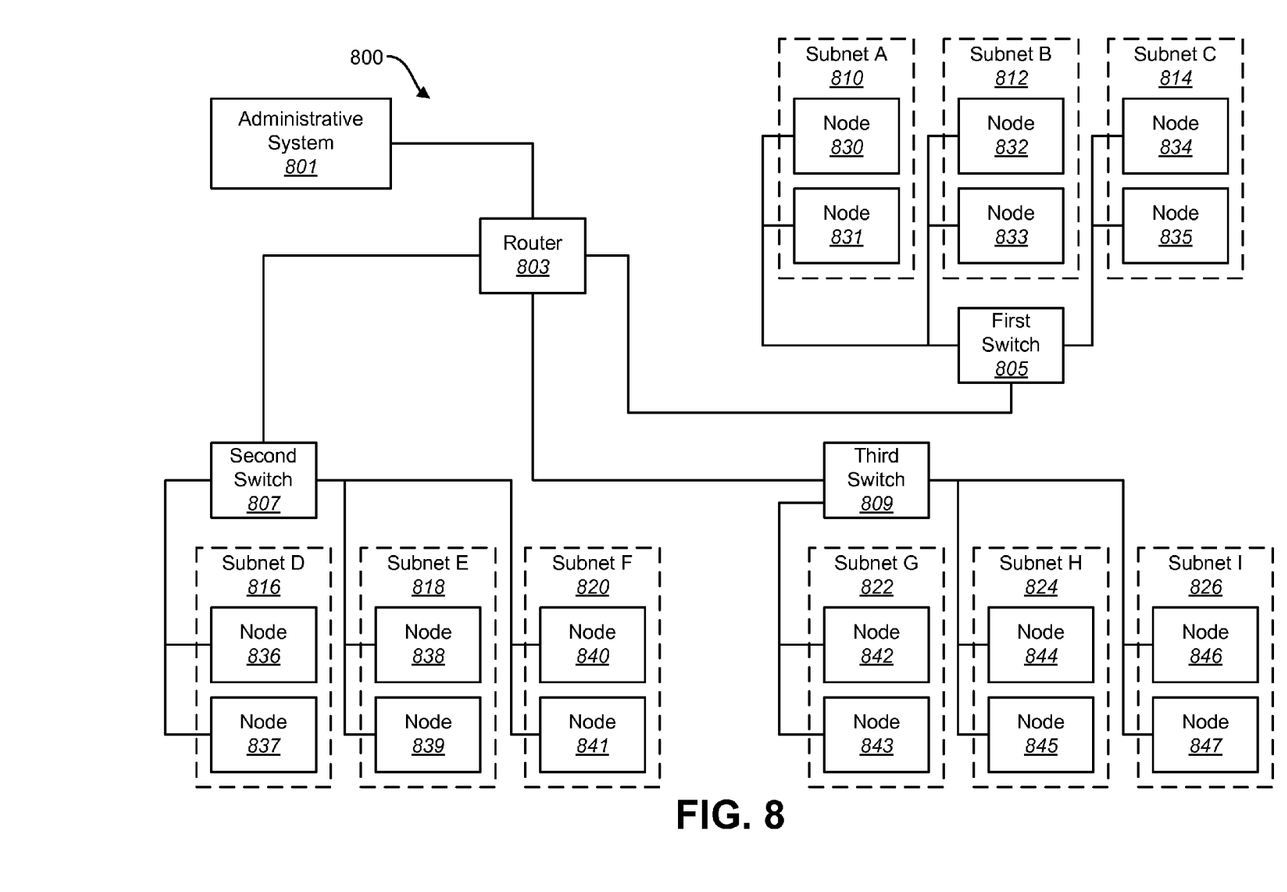
FIG. 8 is a block diagram illustrating a computer network on which the present systems and methods may be implemented.

FIG. 8 is a block diagram illustrating a computer network 800 on which the present systems and methods may be implemented. An administrative system 801 may connect to a router 803.

The router 803 may be connected to three switches: a first switch 805, a second switch 807 and a third switch 809. The first switch 805, second switch 807, and the third switch 809 may each connect to three subnets. The first switch 805 may connect to subnet A 810, subnet B 812, and subnet C 814. The second switch 807 may connect to subnet D 816, subnet E 818, and subnet F 820. The third switch 809 may connect to subnet G 822, subnet H 824, and subnet 1826. Network 800 groups may be configured in a variety of ways and may include a local area network, and one or more subnets 810, 812, and 814. The network nodes 830-847 may represent computer systems or devices on the computer network 800. One or more of the nodes may use configurations of the systems and methods described herein. The network 800 may include both wired and wireless connections to nodes or elements 830-847 within the network 800.

Figure 9:
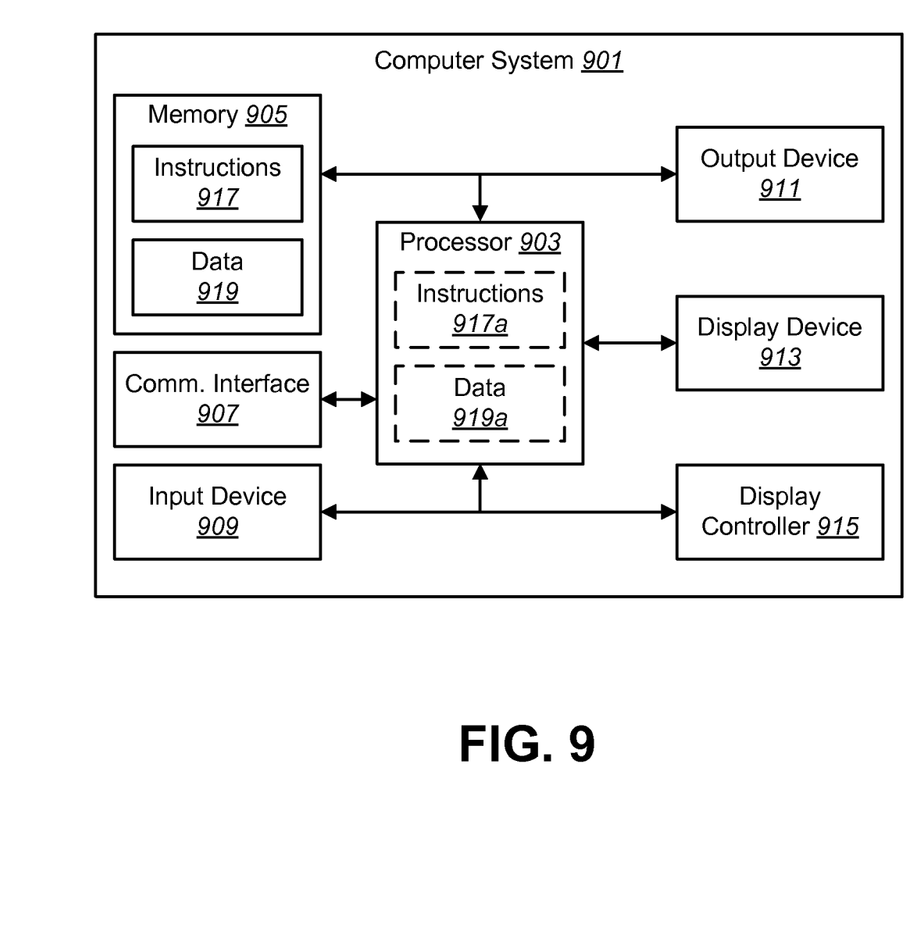
FIG. 9 is a block diagram illustrating the major hardware components typically utilized in a computer system.

FIG. 9 is a block diagram illustrating the major hardware components typically utilized in a computer system 901. The illustrated components may be located within the same physical structure or in separate housings or structures. For example, the computer system 901 may implement an administrative system 302, a managed node 306, a phone system 318, or an email system 320.

The computer system 901 may include a processor 903 and memory 905. The processor 903 may control the operation of the computer system 901 and may be embodied as a microprocessor, a microcontroller, a digital signal processor (DSP) or other device known in the art. The processor 903 may be referred to as a CPU and typically performs logical and arithmetic operations.

The memory 905, which may include both read-only memory (ROM) and random access memory (RAM), may provide instructions 917 and data 919 to the processor 903. A portion of the memory 905 may also include non-volatile random access memory (NVRAM). The memory 905 may include any electronic component capable of storing electronic information, and may be embodied as ROM, RAM, magnetic disk storage media, optical storage media, flash memory, on-board memory included with the processor 903, EPROM memory, EEPROM memory, registers, a hard disk, a removable disk, a CD-ROM, etc.

The memory 905 may store program instructions 917 and other types of data 919. The program instructions 917 may be executed by the processor 903 to implement some or all of the methods disclosed herein. The processor 903 may also use the data 919 stored in the memory 905 to implement some or all of the methods disclosed herein. As a result, instructions 917a and data 919a may be loaded and/or otherwise used by the processor 903.

The computer system 901 typically also includes one or more communication interfaces 907 for communicating with other electronic devices. The communication interfaces 907 may be based on wired communication technology, wireless communication technology, or both. Examples of different types of communication interfaces 907 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 901 typically also includes one or more input devices 909 and one or more output devices 911. Examples of different kinds of input devices 909 include a keyboard, mouse, microphone, remote control device, button, joystick, trackball, touchpad, lightpen, etc. Examples of different kinds of output devices 911 include a speaker, printer, etc. One specific type of output device which is typically included in a computer system is a display device 913. Display devices 913 used with configurations disclosed herein may utilize any suitable image representation technology, such as a cathode ray tube (CRT), liquid crystal display (LCD), light-emitting diode (LED), gas plasma, electroluminescence, or the like. A display controller 915 may also be provided, for converting data stored in the memory 905 into text, graphics, and/or moving images (as appropriate) shown on the display device 913.

Of course, FIG. 9 illustrates only one possible configuration of a computer system 901. Various other architectures and components may be utilized.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for automatically resetting a password, comprising:
    identifying a failed login attempt on a managed node by a management agent running on the managed node, wherein the identifying comprises looking for windows visible on a desktop of the managed node that communicate to a user that the last login failed;
    determining, by the management agent, if a failed login condition is satisfied;
    verifying that the managed node is associated with the user, wherein verifying comprises receiving a secondary identification indicator unique to the user from the managed node, wherein the secondary identification indicator is received from a scanner;
    providing a prompt, by the management agent on the managed node, about resetting a password if the failed login condition is satisfied and if the managed node is associated with the user;
    communicating with a management application on an administrative system to request generating a new password based on a response to the prompt; and
    sending from the administrative system the new password to the user via voicemail or email.

2. The method of claim 1, wherein the determining comprises determining if a number of failed login attempts on the managed node since a successful login attempt is greater than a predefined threshold.

3. The method of claim 1, further comprising storing a record of the failed login attempt.

4. The method of claim 3, wherein the prompting comprises displaying a message to the user asking if the user would like to reset the password.

5. The method of claim 1, wherein the identifying comprises monitoring all login attempts.

6. The method of claim 1, wherein verifying that the managed node is associated with a user comprises determining that the managed node is a node on which the user logs into more than any other node.

7. An apparatus for automatically resetting a password, the apparatus comprising:
    a processor;
    memory in electronic communication with the processor; and
    instructions stored in the memory, the instructions being executable by the processor to:
        identify a failed login attempt on a managed node by a management agent running on the managed node, wherein the identifying comprises looking for windows visible on a desktop of the managed node that communicate to a user that the last login failed;
        determine, by the management agent, if a failed login condition is satisfied;
        verify that the managed node is associated with the user, wherein verifying comprises receiving a secondary identification indicator unique to the user from the managed node, wherein the secondary identification indicator is received from a scanner;
        provide a prompt, by the management agent on the managed node, about resetting a password if the failed login condition is satisfied;
        communicate with a management application on an administrative system to request generating a new password based on a response to the prompt; and
        send from the administrative system the new password to the user via voicemail or email.

8. The apparatus of claim 7, wherein the instructions executable to determine comprise instructions executable to determine if a number of failed login attempts on the managed node since a successful login attempt is greater than a predefined threshold.

9. The apparatus of claim 7, further comprising instructions executable to store a record of the failed login attempt.

10. The apparatus of claim 7, wherein the instructions executable to prompt comprise instructions executable to display a message to the user asking if the user would like to reset the password.

11. The apparatus of claim 7, wherein the instructions executable to identify comprise instructions executable to monitor all login attempts.

12. The apparatus of claim 7, wherein the instructions executable to verify comprises determining that the managed node is a node on which the user logs into more than any other node.

13. A computer-program product for automatically resetting a password, the computer-program product comprising a non-transitory computer-readable medium having instructions thereon, the instructions comprising:
    code for identifying a failed login attempt on a managed node by a management agent running on the managed node, wherein the identifying comprises looking for windows visible on a desktop of the managed node that communicate to a user that the last login failed;

code for determining, by the management agent, if a failed login condition is satisfied;

code for verifying that the managed node is associated with the user, wherein verifying comprises receiving a secondary identification indicator unique to the user from the managed node, wherein the secondary identification indicator is received from a scanner;

code for providing a prompt, by the management agent on the managed node about resetting a password if the failed login condition is satisfied;

code for communicating with a management application on an administrative system to request generating a new password based on a response to the prompt; and code for sending from the administrative system the new password to the user via voicemail or email.

14. The computer-program product of claim 13, wherein the code for determining comprises code for determining if a number of failed login attempts on the managed node since a successful login attempt is greater than a predefined threshold.

15. The computer-program product of claim 13, further comprising code for storing a record of the failed login attempt.

16. The computer-program product of claim 13, wherein the code for prompting comprises code for displaying a message to the user asking if the user would like to reset the password.

17. The computer-program product of claim 13, wherein the code for identifying comprises code for monitoring all login attempts.

18. The computer-program product of claim 13, wherein the code for verifying comprises code for determining that the managed node is a node on which the user logs into more than any other node.

* * * * *

UNITED STATES PATENT AND TRADEMARK OFFICE
CERTIFICATE OF CORRECTION

| | | |
|---|---|---|
| PATENT NO. | : 8,973,113 B1 | Page 1 of 1 |
| APPLICATION NO. | : 12/761114 | |
| DATED | : March 3, 2015 | |
| INVENTOR(S) | : David A. Eatough | |

It is certified that error appears in the above-identified patent and that said Letters Patent is hereby corrected as shown below:

In the specification

In column 9, line 17 please delete "subnet 1826" and replace it with --subnet I 826--.

Signed and Sealed this
Sixth Day of October, 2015

Michelle K. Lee
*Director of the United States Patent and Trademark Office*